US010749927B2

(12) United States Patent
Hou et al.

(10) Patent No.: US 10,749,927 B2
(45) Date of Patent: Aug. 18, 2020

(54) WEBPAGE LOADING METHOD, APPARATUS AND SYSTEM

(71) Applicant: Guangzhou Shenma Mobile Information Technology Co., Ltd., Guangzhou (CN)

(72) Inventors: Peng Hou, Guangzhou (CN); Jie Meng, Guangzhou (CN); Minghai Shao, Guangzhou (CN); Yining Chen, Guangzhou (CN)

(73) Assignee: Guangzhou Shenma Mobile Information Technology Co., Ltd., Guangzhou, Guangdong (CN)

( * ) Notice: Subject to any disclaimer, the term of this patent is extended or adjusted under 35 U.S.C. 154(b) by 139 days.

(21) Appl. No.: 15/272,039

(22) Filed: Sep. 21, 2016

(65) Prior Publication Data

US 2017/0085676 A1 Mar. 23, 2017

(30) Foreign Application Priority Data

Sep. 22, 2015 (CN) .......................... 2015 1 0608661

(51) Int. Cl.
*H04L 29/08* (2006.01)
*G06F 16/957* (2019.01)
(Continued)

(52) U.S. Cl.
CPC ............ *H04L 67/02* (2013.01); *G06F 16/957* (2019.01); *H04L 67/04* (2013.01); *H04L 67/06* (2013.01);
(Continued)

(58) Field of Classification Search
CPC . G06F 9/44526; H04L 67/2838; H04L 67/42; H04L 67/34
See application file for complete search history.

(56) References Cited

U.S. PATENT DOCUMENTS

2003/0163372 A1* 8/2003 Kolsy .................... G06Q 30/02
705/14.49
2007/0038956 A1* 2/2007 Morris .................. G06F 3/0481
715/808
(Continued)

FOREIGN PATENT DOCUMENTS

| CN | 104239441 | 12/2014 |
|---|---|---|
| CN | 104484383 | 4/2015 |
| CN | 105045645 B | 8/2016 |

OTHER PUBLICATIONS

Office Action for CN App. No. 201510608661.7, dated Mar. 15, 2016, 16 pages.
(Continued)

*Primary Examiner* — Barbara B Anyan
(74) *Attorney, Agent, or Firm* — Sheppard Mullin Richter & Hampton LLP

(57) ABSTRACT

The present application provides a webpage loading method, apparatus and system. The method includes: loading a webpage resource, wherein a JS file of each module resource is set behind the body resource, extracting a JS resource required for running of the JS file from each module resource, and registering the JS resource into a pre-established function running pool, and after the body resource loading is completed, injecting the JS resource of each module resource in the function running pool into the corresponding JS file.

14 Claims, 5 Drawing Sheets

(51) Int. Cl.
  *G06F 16/332* (2019.01)
  *G06F 9/445* (2018.01)
  *H04L 29/06* (2006.01)
  *G06F 3/0481* (2013.01)
(52) U.S. Cl.
  CPC ........ *G06F 3/0481* (2013.01); *G06F 9/44526* (2013.01); *G06F 16/3322* (2019.01); *H04L 29/06047* (2013.01)

(56) References Cited

U.S. PATENT DOCUMENTS

| | | | | |
|---|---|---|---|---|
| 2009/0100356 | A1* | 4/2009 | Kujda | G06F 16/957 715/760 |
| 2010/0169863 | A1 | 7/2010 | Adams | |
| 2013/0055063 | A1* | 2/2013 | Mondal | G06F 9/4552 715/234 |
| 2013/0212467 | A1* | 8/2013 | Ruan | G06F 16/9577 715/234 |
| 2014/0280043 | A1* | 9/2014 | Griffin | G06F 16/3322 707/722 |
| 2014/0304588 | A1* | 10/2014 | Li | G06F 16/9577 715/234 |
| 2015/0032803 | A1* | 1/2015 | Graham-Cumming | H04L 29/06047 709/203 |
| 2015/0074513 | A1* | 3/2015 | Liang | G06F 16/9577 715/234 |
| 2016/0188552 | A1* | 6/2016 | Wang | G06F 40/117 715/236 |
| 2016/0314219 | A1* | 10/2016 | Yu | G06F 8/36 |

OTHER PUBLICATIONS

"Web page loading process" located at <www.educity.cn/wenda/143254.html>, last visited on Mar. 3, 2017, 12 pages.
"How to adjust the JS file to improve the speed of the page" located at <www.admin5.com/article/2014-0225/537588.shtml>, last visited on Mar. 6, 2017, 6 pages.
First Search dated Feb. 26, 2016, issued in related Chinese Application No. 201510608661.7 (1 page).
First Search dated Jan. 18, 2019, issued in related Chinese Application No. 201610836641.X (1 page).
First Office Action dated Jan. 30, 2019, issued in related Chinese Application No. 201610836641.X (18 pages), w/ English machine translation.
Second Office Action dated Jul. 18, 2019, issued in related Chinese Application No. 201610836641.X, with English machine translation (18 pages).
Notice of Substantive Examination Result dated Sep. 9, 2019, issued in related Indonesian Application No. P00 2016 06356, with English machine translation (4 pages).
First Examination Report dated Feb. 26, 2020, issued in related Indian Application No. 201644031820, with English machine translation (7 pages).

* cited by examiner

WEBPAGE LOADING METHOD, APPARATUS AND SYSTEM

CROSS REFERENCE TO RELATED APPLICATION

This application is based upon and claims priority to Chinese Patent Application No. 201510608661.7, filed Sep. 22, 2015, the entire contents of which are incorporated herein by reference.

TECHNICAL FIELD

The present application relates to the field of network technologies, and more particularly to a webpage loading method, apparatus and system.

BACKGROUND

With rapid development of Internet technologies, the Internet has more and more webpage contents. The increase of webpage contents on the Internet requires a higher development efficiency for web developers. At present, one webpage basically includes three parts, head, body and tail. It can be understood that a webpage resource corresponding to the webpage is also divided into three parts: a head resource, a body resource and a tail resource. The body is a major part of the webpage, and it is mainly developed by technical staff.

In order to increase the efficiency of developing a webpage body, a technical measure generally employed in the industry is modularizing the body, that is, the body is divided into multiple modules, for example, a weather module, a search module, a music module and the like on the webpage. The modularization enables each technical staff to take charge of one module alone, thereby improving the efficiency of developing the body, and causes one body to have one or more modules thereon. In the case that the body includes multiple modules, it can be understood that the body resource corresponding to the body also includes module resources of respective modules.

In an actual application, a browser may load a webpage resource sent by a server, thus displaying webpage content. At present, the browser may load the webpage resource in a top-down manner; that is, the head resource of the webpage resource is loaded at first, then the body resource of the webpage resource is loaded, and finally the tail resource of the webpage resource is loaded. In the process of loading the body resource, a top-down loading manner is still employed, resources sorted in the top are loaded at first and then resources sorted in the bottom are loaded, until loading of all the body resources are completed.

When loading a module resource in the body resources, the browser may load three types of files included in the module resource: an independent function template file, a Cascading Style Sheets (CSS) file and a JavaScript (JS) file; after loading of the three types of files have been completed, other body resources after the module resource are further loaded.

However, in one module resource, after loading of the independent function template file and the CSS file are completed, webpage content corresponding to the module resource can be displayed; while running the JS file merely improves the function that can be implemented by the module. That is, whether execution of the JS file of each module resource is completed is irrelevant to display of webpage content, and the JS file of each module resource is run at a lower speed; this results in that, only by spending resources and time in executing the JS file of each module resource at first, can the browser display the webpage content, that is, the JS file of each module resource may hinder rendering of the webpage content.

In terms of a first screen page of a webpage, display efficiency of the first screen page is the most important, that is, the browser can rapidly display all content of the webpage. However, in the light of the current manner of a browser to load a webpage resource, only by spending a longer time can the browser display a first screen page of a webpage, which reduces the display efficiency of the first screen page.

Therefore, a webpage loading manner is required now to improve the display efficiency of the first screen page of the webpage.

SUMMARY

The present application provides a webpage loading method, apparatus and system. The disclosed technology improves webpage display efficiency of a screen.

According to one aspect of the present application, a webpage loading method includes loading a webpage resource, wherein the webpage resource includes a body resource and the body resource includes a module resource, extracting a JS resource for running the JS file from the module resource, and registering the JS resource into a function running pool, and after the body resource loading is completed, injecting the JS resource of the module resource in the function running pool into the JS file. The webpage resource may further include a head resource and a tail resource. The webpage resource may include a JS file set behind the body resource.

In some embodiments, the method may further includes determining whether the body resource loading is completed, and if it is determined that the body resource loading is completed, triggering a loading completion event, and after the loading completion event is detected, determining that the body resource loading is completed. The method then performs the injecting step.

In some other embodiments, the method may further includes, after the injecting the JS resource of each module resource in the function running pool into the JS file, clearing the function running pool.

In some embodiments, before the loading a webpage resource, the method may include receiving a webpage address, the webpage address corresponding to the webpage resource, and sending the webpage address to a server from which the webpage resource is loaded.

According to another aspect of the present application, a webpage loading method includes receiving a webpage address from a browser, calculating a webpage resource required by the webpage address, the webpage resource including a body resource, the body resource including a module resource. The webpage resource may further include a JS file set behind the body resource. The method may further include sending the webpage resource to the browser.

According to a further aspect of the present application, a webpage loading apparatus includes a loading unit configured to load a webpage resource, wherein the webpage resource includes a body resource and the body resource includes a module resource, a registration unit configured to extract a JS resource for running of the JS file from the module resource, and register the JS resource into a function running pool, a determination unit for determining whether the body resource loading is completed, and an injection unit, in response to the determination that the body resource loading is completed, injecting the JS resource of each module resource in the function running pool into the JS file. The webpage resource may further include a head resource and a tail resource. The webpage resource may further include a JS file set behind the body resource.

In some embodiments, the determination unit may be further configured to, after the body resource loading is completed, trigger a loading completion event; and after the loading completion event is detected, determine that the body resource loading is completed.

In some other embodiments, the apparatus may further include a clearing unit configured to, after the injecting the JS resource of each module resource in the function running pool into the JS file, clear the function running pool.

In some further embodiments, the apparatus may further include a first receiving unit configured to receive a webpage address, the webpage address corresponding to the webpage resource, and a first sending unit configured to send the webpage address to the server.

According to a further aspect of the present application, a webpage loading apparatus, includes a second receiving unit configured to receive a webpage address from a browser, a calculation unit configured to calculate a webpage resource required by the webpage address, the webpage resource including a body resource, which includes at least one module resource, and a JS file of each module resource being set behind the body resource, and a second sending unit configured to send the webpage resource to the browser.

According to another aspect of the present application, a webpage loading system includes a browser and a server. The browser is used for loading a webpage resource sent by a server. The webpage resource includes a head resource, a body resource, and a tail resource. The body resource includes at least one module resource. A JS file of each module resource is set behind the body resource. When loading is performed on each module resource in the webpage resource, a JS resource required for running of the JS file is extracted from each module resource, and the JS resource is registered into a pre-established function running pool. After it is determined that the body resource loading is completed, the JS resource of each module resource in the function running pool is injected into the corresponding JS file. The server is used for receiving a webpage address sent by the browser, calculating a webpage resource required by the webpage address. The webpage resource includes at least one module resource, and a JS file of each module resource is set behind the body resource. The server also sends the webpage resource to the browser.

The technologies disclosed in the present application have at least the following beneficial effects: the JS file set inside each module resource is set behind the body resource of the webpage resource. As the webpage resource is loaded in a top-down manner, the process of loading the webpage resource by the browser is: first loading the head resource, then loading the body resource, and then running the JS file inside each module after the body resource loading is completed, and finally loading the tail resource. As the body resource includes the main display content of a first screen page, the first screen page of the webpage can be displayed right after the body resource loading is completed. Then, the browser loads the JS file of each module resource, to improve the specific function of each module.

In the present application, the process to be executed originally in the process of loading the body resource is executed after the body resource loading is completed. The program of the body resource to display the first screen page is advanced, and the program of running the JS file by each module is delayed, and thus the efficiency of displaying the first screen page can be improved. Moreover, the present application can speed up display of the first screen page without increasing additional resource request overhead, so that the performance of the webpage can be improved.

BRIEF DESCRIPTION OF THE DRAWINGS

In order to describe the technical solutions in the embodiments of the present application or the prior art more clearly, the accompanying drawings required for describing the embodiments or the prior art are introduced briefly in the following. Apparently, the accompanying drawings in the following description are only some embodiments of the present application; persons of ordinary skill in the art can obtain other accompanying drawings according to the accompanying drawings without any creative efforts.

DETAILED DESCRIPTION

The technical solutions in the embodiments of the present application will be clearly and completely described below with reference to the accompanying drawings in the embodiments of the present application. It is obvious that the embodiments to be described are only some rather than all of the embodiments of the present application. All other embodiments derived by persons of ordinary skill in the art based on the embodiments of the present application without creative activities should fall within the protection scope of the present application.

A webpage may be divided into three parts: head, body and tail. After obtaining a webpage address, a server can query in a database a webpage resource corresponding to the webpage address, i.e., a head resource, a body resource, and a tail resource. The main role of the head resource is to display iconic content of a company or a website, for example, enterprise LOGO, enterprise name and other information; the main role of the tail resource is to display enterprise contact, ICP filing and other information; and the main role of the body resource is to display main content of the webpage.

As the role of the body resource is to display main content of the webpage, the body resource plays an important role in the webpage resource. In the process of loading a webpage resource by a browser, if the body resource loading is completed, the display of general content of one webpage is completed.

In order to improve the efficiency of developing a webpage by technical staff, the body of the webpage generally has multiple modules, and each module has its own module resource. Each module resource mainly includes an independent function template, a CSS file and a JS file. The CSS file referred to in the present application is a file with the suffix.css in the module; and the JS file is a file with the suffix.js.

The CSS (Cascading Style Sheet) file in each module is mainly used to define a display style of an HTML or one category of HTML tags. The JS file is a software program written in a javascript scripting language and used for performing main functions of the module. For example, one hyperlink character string; in the process of implementing the hyperlink character string, the CSS file mainly displays the font (Song typeface, regular script, imitation Song typeface or the like) of the character string, and the role of the JS file is adding a hyperlink to the character string.

Figure 1:
FIG. 1 is a schematic structural diagram of a webpage loading system according to an embodiment of the present application.

As shown in FIG. 1, in one of the embodiments of the present application, a webpage loading system is provided. According to the embodiment, the system may include a server 100 and a browser 200. The server 100 and the browser 200 communicate with each other, e.g., wirelessly.

The browser 200 is a client installed onto a terminal to surf the Internet, and a user can use the browser 200 to search for information required by the user. The user can enter a webpage address in an address bar of the browser 200, in order that the browser 200 sends the webpage address to the server 100, and requests acquisition of a webpage resource corresponding to the webpage address.

The server 100 may receive the webpage address sent by the browser 200, fetch the webpage resource corresponding to the webpage address, and send the webpage resource to the browser 200, in order that the browser 200 loads the webpage resource, and can display the webpage resource to the user.

Figure 2:
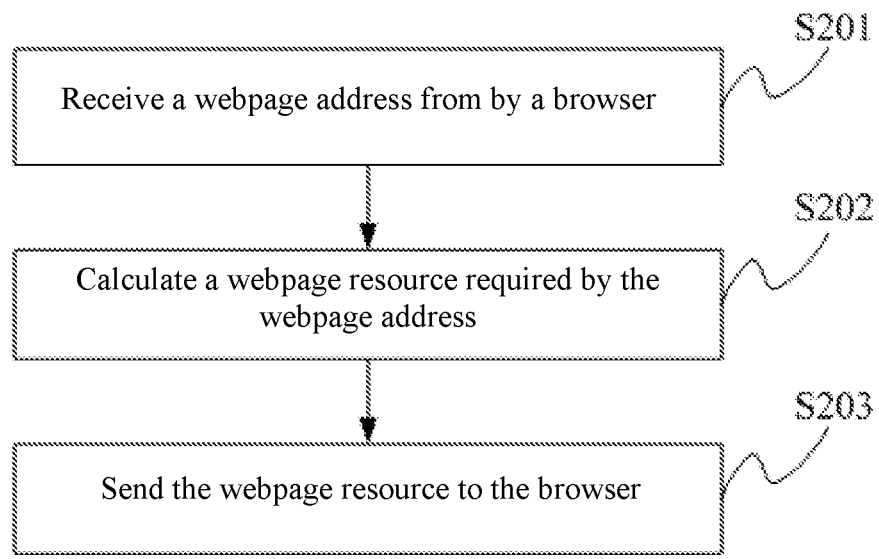
FIG. 2 is a flow chart of one webpage loading method according to an embodiment of the present application.

As shown in FIG. 2, in the present application, a webpage loading method is provided, and applied to the server shown in FIG. 1. According to some embodiments, the method includes the following steps:

Step S201: receiving a webpage address sent by a browser.

The server receives the webpage address sent by the browser in real time, and the webpage address may represent a webpage resource that a user hopes to acquire. For example, if the user enters www.taobao.com, it indicates that the user now hopes to view a first screen page of Taobao.

Step S202: calculating a webpage resource required by the webpage address; the webpage resource includes at least one module resource, and a JS file of each module resource is set behind the body resource.

The webpage resource may include multiple module resources, and a JS file of each module resource may hinder rendering of a first screen page. To solve the problem, the server, when constructing a webpage resource and after determining a body resource, extracts the JS file of each module resource from the body resource, and sets the JS file behind the body resource; in order that the browser, when loading the webpage resource, can first load the body resource, and after the body resource loading is completed, load the JS file of each module resource.

Step S203: sending the webpage resource to the browser.

The server sends the webpage resource calculated according to step S202 to the browser, in order that the browser loads and displays the webpage resource to the user.

Figure 3:
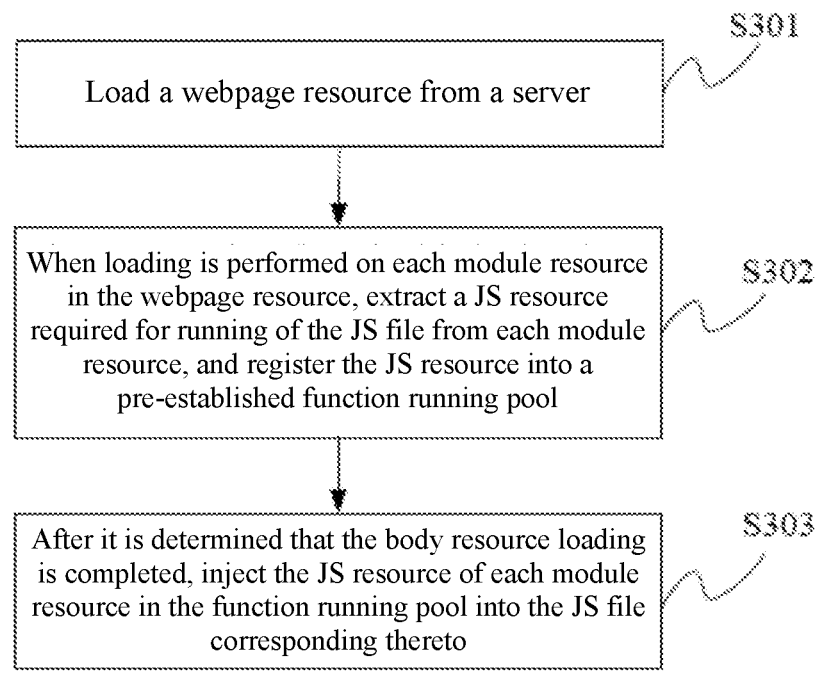
FIG. 3 is a flow chart of another webpage loading method according to an embodiment of the present application.

The embodiment shown in FIG. 2 is a process executed by a server side, and a process executed by a browser side is introduced below. As shown in FIG. 3, in the present application, a webpage loading method is provided, and applied to the browser shown in FIG. 1. According to some embodiments, the method may include the following steps:

Step S301: loading a webpage resource sent by a server, wherein the webpage resource includes a head resource, a body resource and a tail resource. The body resource may include at least one module resource, and a JS file of each module resource is set behind the body resource.

The browser may receive the webpage resource sent by the server, and the body resource of the webpage resource, in addition to the module resource corresponding to a module, also has other resources; the module resource is interleaved among the other resources, and all the resources are sorted in a top-down manner. Moreover, a JS file of each module resource is set behind the body resource.

When the browser loads the webpage resource, a top-down loading manner may be employed. That is, the head resource is loaded at first, then the body resource is loaded, the JS file of each module resource set behind the body resource is loaded, and finally the tail resource is loaded. The loaded resources can be displayed on a webpage, and for the resources not loaded, a blank webpage is displayed on the webpage.

Figure 4:
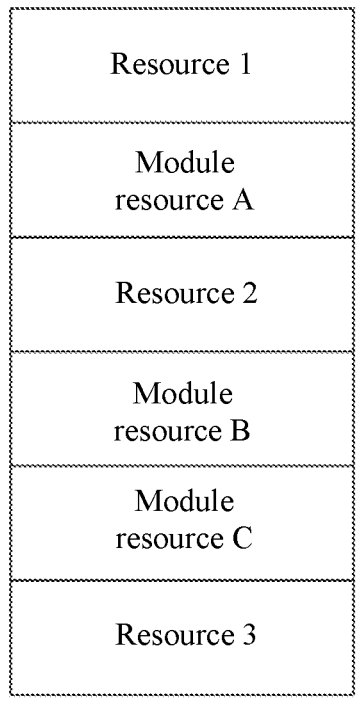
FIG. 4 is a schematic diagram of the body resource in the prior art.

By taking the body resource as an example, as shown in FIG. 4, the body resource includes: a module resource A, a module resource B, and a module resource C, and other resources include a resource 1, a resource 2, and a resource 3; JS files of the module resource A, the module resource B, and the module resource C are respectively a JS file A, a JS file B, and a JS file C. As the resource 1 is sorted in the top in the body resource, the resource 1 is loaded at first, and after loading of the resource 1 is completed, it will be displayed on the webpage. Other content not loaded may not be displayed on the webpage.

In the process of loading the body resource by the browser, when the browser performs loading on a module resource, step S302 is performed. After step S302 is completely performed, the resources not loaded are further loaded in sequence, until the body resource loading is completed, and then the method proceeds to step S303.

For example, still using the above example, the browser, after loading the resource 1, will load the module A, and at this point, related content of step S302 is executed. After step S302 is completely performed, the resource 2 is further loaded, and content corresponding to the resource 2 is displayed on the webpage. Below the resource 2 is the module resource B, step S302 is repeated, after step S302 is completely performed, the module resource C is further loaded, and step S302 is repeated; finally the resource 3 is loaded to complete loading of the body resource, and the method proceeds to step S303.

Step S302: When loading is performed on each module resource in the webpage resource, extracting a JS resource required for running of the JS file from each module resource, and registering the JS resource into a pre-established function running pool.

The step is uniform for the execution process of each module, and thus only the execution process of one module is described in detail, while the execution process of other modules is not repeated any more.

The module resource corresponding to each module may be divided into two parts: one part is a resource required for subsequent running of the JS file, and the part may be referred to as a JS resource; and the other part includes resources not required for running of the JS file, and the part is referred to as other resources.

As the JS file of each module resource is set behind the body resource, when the body resource is loaded, the JS file of each module resource is not executed. However, the JS file of each module that is still stored in the module resource corresponding to each module, so that after the body resource loading is completed, the JS file of the module resource can be run; therefore, when the browser performs loading on a module, a JS resource required for running of the JS file is extracted from the module resource corresponding to the module; and the JS resource is registered into a pre-established function running pool. The function running pool is pre-established by the browser, and the function running pool may be objects, arrays and other various data structures that can store function variables.

For example, when the browser performs loading on a module that needs to be run, the module registers into the function running pool a function name, a parameter, a context and the like that need to be run by the module. For example, a webpage has two modules, a module A and a module B. When the browser performs loading on the module A and the module B, the module A and the module B successively extract JS parameters in an order of webpage loading, and the JS parameters may be function names, parameters, contexts and other parameters of JS files.

| function name of JS file | parameter | context | other parameter |
| --- | --- | --- | --- |
| functionA | paramsA | contextA | otherA |
| functionB | paramsB | contextB | otherB |

As the step is necessary for each module, in the process of loading the webpage resource, the JS resource of each module is registered into the function running pool, to cause the function running pool to include the JS resource of each module.

As the JS resource of the module has been registered into the function running pool, when the module is loaded, it may not be necessary to run the JS resource, and it is only necessary to load other resources (the resources not required for running of the JS file) in the module resource corresponding to the module. The part of resource may be a resource corresponding to a CSS file, after a resource corresponding to the CSS file is loaded, the interface of the module may be displayed, but a specific function cannot be used, and only after the JS resource of the JS file is run, can the function of the module be improved.

For example, for one hyperlink character string, in the process of implementing the hyperlink character string, the CSS file mainly displays the font (Song typeface, regular script, imitation Song typeface or the like) of the character string, and the role of the JS file is to add a hyperlink to the character string. If only the CSS file is run, only the character string with the prescribed font is displayed, but the character string does not have a hyperlink function yet. That is, the technical effect of the present application is first displaying a character string in order that a user sees it and has an intuitive feeling, and then adding a hyperlink to the character string to improve the specific function of the character string.

Step S303: After it is determined that the body resource loading is completed, injecting the JS resource of each module resource in the function running pool into the JS file corresponding thereto.

After the body resource loading is completed, a loading completion event is triggered; and after detecting the loading completion event, the browser determines that the body resource loading is completed. If it is detected that the body resource loading is completed, it indicates that the display of the first screen page has been completed. At this point, it is feasible to inject the JS resource of each module in the function running pool into each JS file, and then each JS file can load the module resource that has been injected.

That is, a JS resource is injected into a real JS file, to cause a business logic, which should be executed in the middle of the webpage, to be executed after the first screen page loading is completed. At this point, when the JS file of each module resource is run, although it may still hinder rendering of the browser, as rendering of the first screen page of the webpage (that is, the main visible content of the webpage) has been completed, it is convenient for the user to perceive the overall content of the webpage. Execution of the JS file may be delayed. In other words, the operation of improving the specific function of the module (the function of performing a human-computer interaction operation) may be delayed. Thus, the efficiency of displaying the first screen page can be improved.

In the present application, when the browser performs loading on a module, in order to ensure the efficiency of displaying the first screen page, the JS file inside the module is not executed temporarily. Instead, the module resource required for running of the JS file is registered into a pre-established function running pool, in order that the JS file of each module resource is run in a unified way after the body resource loading is completed.

In other words, in the present application, the program originally executed in the process of loading the body resource is delayed and executed after the body resource loading is completed. The resource originally run after the module resource in the body resource is run in advance prior to the JS file of the module resource. As the body resource includes the main display content of the webpage, after the body resource loading is completed, the display of the first screen page of the webpage is also completed. In the present application, as the process of loading the JS file of the module resource is delayed and the process of loading the body resource is advanced, the efficiency of displaying the first screen page of the webpage can be improved.

It can be understood that, after loading of the JS resources in the function running pool are completed by the JS modules, it is feasible to clear the function running pool, in order to ensure that the module resources that have been loaded before are not repeatedly run.

It can be seen from the above that the embodiments of the present application have the following beneficial effects:

In the present application, the JS file originally set inside each module resource is set behind the body resource of the webpage resource. As the webpage resource is loaded in a top-down manner, the process of loading the webpage resource by the browser is: first loading the head resource, then loading the body resource, and then running the JS file inside each module after the body resource loading is completed, and finally loading the tail resource.

As the body resource includes main display content of the first screen page, the first screen page of the webpage can be displayed right after the body resource loading is completed.

Then, the browser loads the JS file of each module resource, to improve the specific function of each module.

In the embodiments of the present application, the business logic to be executed originally in the process of loading the body resource is executed after the body resource loading is completed. The program of the body resource to display the first screen page is advanced, and the program of running the JS file by each module is delayed, and thus the efficiency of displaying the first screen page can be improved. Moreover, the present application can speed up display of the first screen page without increasing additional resource request overhead, so that the performance of the webpage can be improved.

In order to describe the difference between the present application and the prior art more clearly, schematic diagrams of webpage resources in the prior art and in the present application are described below. By taking that the body resource includes a module resource A and a module resource B as an example, referring to FIG. 5, which is a schematic diagram of the current body resource, it can be seen from FIG. 5 that the body resource includes a common CSS file, a framework JS file, a module resource A and a module resource B.

By taking the module resource A as an example, the module resource A includes a CSS file A, a JS file A, a module resource 1 (other resource not required for running of the JS file) and a JS resource A (the resource required for running of the JS file) of the module resource A. The construction of the module resource B is the same as that of the module resource A, which is not repeated herein. In the embodiment shown in FIG. 5, the developers only need to pay attention to the module resource A and the module resource B, and then the development efficiency can be improved.

Figure 6:
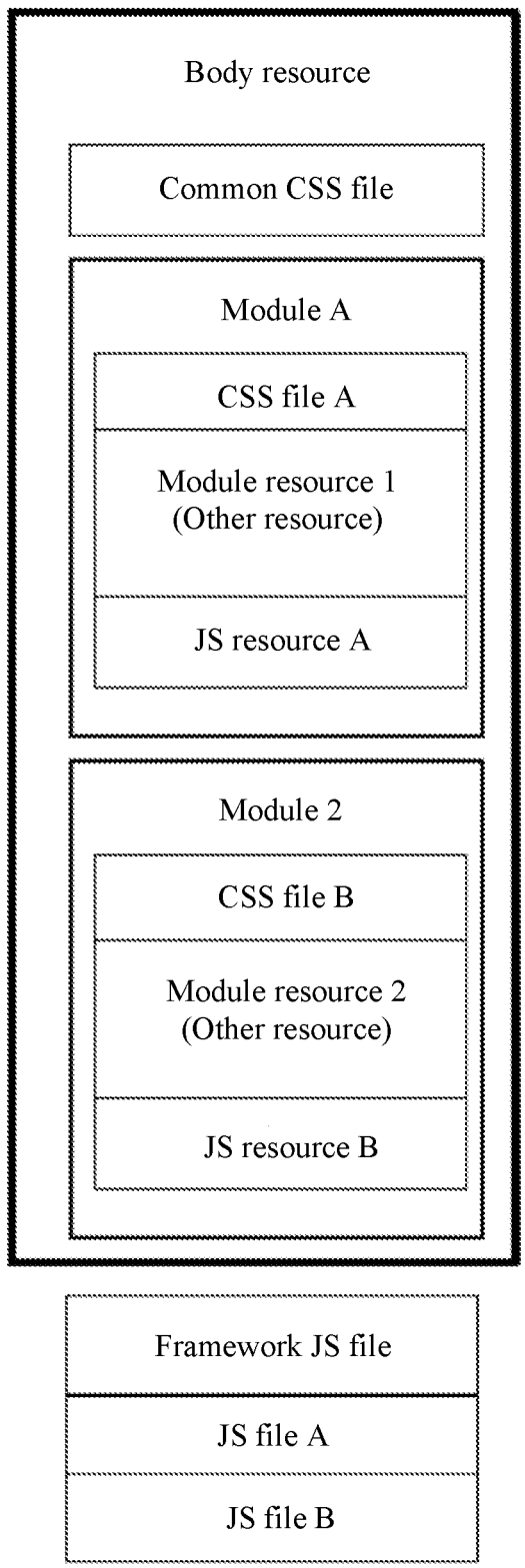
FIG. 6 is a schematic diagram of a body resource in a webpage loading method according to an embodiment of the present application.

FIG. 6 shows a schematic diagram of a body resource in the present application. It can be seen from FIG. 6 that the body resource includes a common CSS file, a framework JS file, a module resource A and a module resource B. The JS file A and the JS file B in the module resource A and the module resource B are set behind the body resource, in order that, after execution of the body resource is completed, the JS file A of the module resource A and the JS file B of the module resource B are run.

Figure 5:
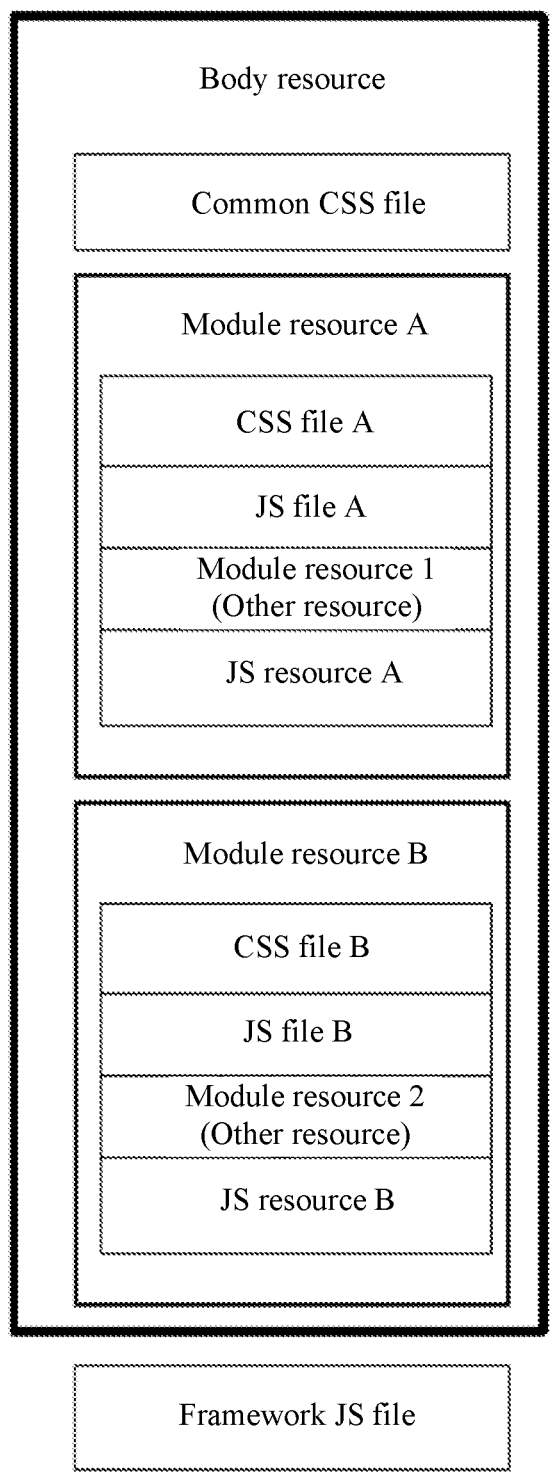
FIG. 5 is a schematic diagram of a body resource in a webpage loading method according to an embodiment of the present application.

It can be seen from FIG. 5 and FIG. 6 that, in the present application, the JS file originally set inside the module resource is set behind the body resource, thus achieving the purpose of improving the efficiency of displaying the first screen page.

Figure 7:
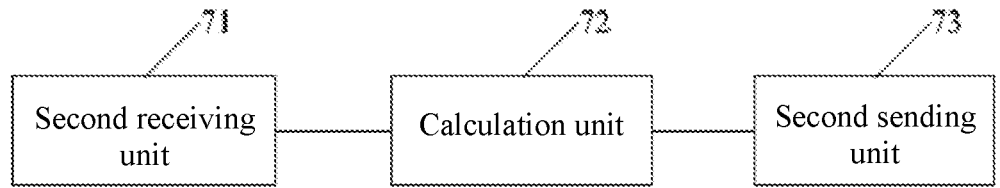
FIG. 7 is a structural diagram of one webpage loading apparatus according to an embodiment of the present application.

Corresponding to the embodiment shown in FIG. 2, as shown in FIG. 7, in the present application, a webpage loading apparatus is provided, which includes:

a second receiving unit 71 for receiving a webpage address sent by a browser;

a calculation unit 72 for calculating a webpage resource required by the webpage address; the webpage resource including at least one module resource, and a JS file of each module resource being set behind the body resource; and a second sending unit 73 for sending the webpage resource to the browser.

Figure 8:
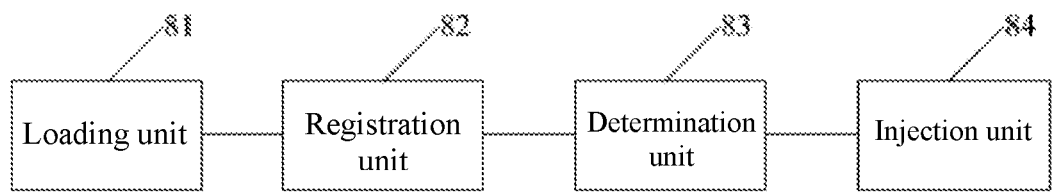
FIG. 8 is a structural diagram of another webpage loading apparatus according to an embodiment of the present application.

Corresponding to the embodiment shown in FIG. 3, as shown in FIG. 8, in the present application, a webpage loading apparatus is provided, which includes:

a loading unit 81 for loading a webpage resource sent by a server, wherein the webpage resource includes a head resource, a body resource and a tail resource, the body resource includes at least one module resource, and a JS file of each module resource is set behind the body resource;

a registration unit 82 for, when loading is performed on each module resource in the webpage resource, extracting a JS resource required for running of the JS file from the module resource, and registering the JS resource into a pre-established function running pool;

a determination unit 83 for determining that the body resource loading is completed;

wherein, the determination unit 83 is further for, after the body resource loading is completed, triggering a loading completion event; and after the loading completion event is detected, determining that the body resource loading is completed; and an injection unit 84 for, after the body resource loading is completed, injecting the JS resource of each module resource in the function running pool into the JS file corresponding thereto.

Figure 9:
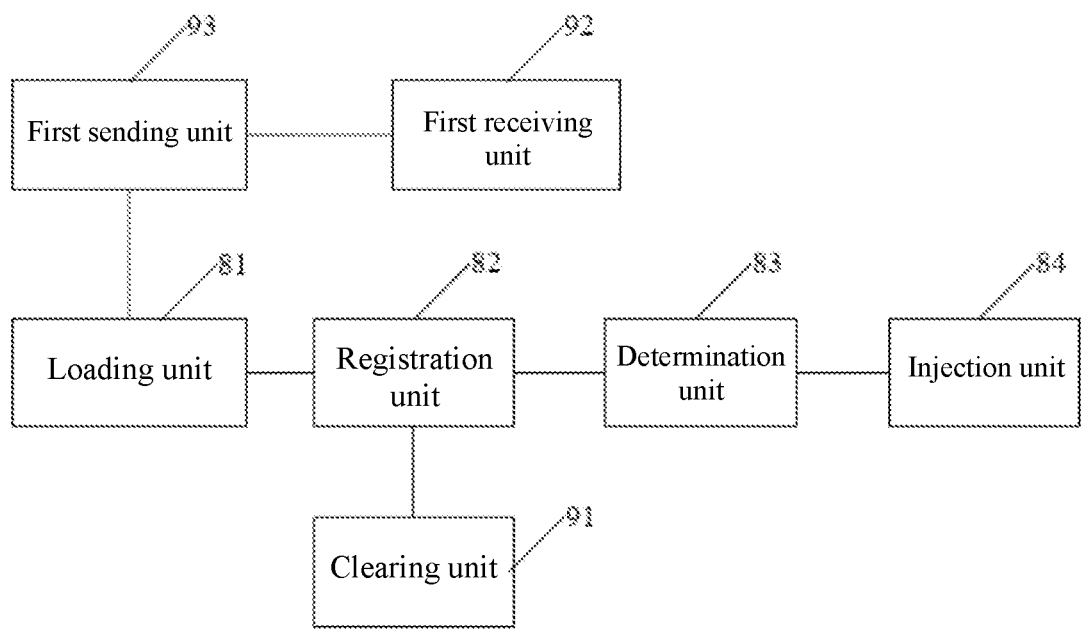
FIG. 9 is a structural diagram of a further webpage loading apparatus according to an embodiment of the present application.

As shown in FIG. 9, in the present application, a webpage loading apparatus is provided, which includes:

a clearing unit 91, used for, after the injecting the JS resource of each module resource in the function running pool into the JS file corresponding thereto, clearing the function running pool;

a first receiving unit 92, used for receiving a webpage address entered by a user, wherein the webpage address corresponds to the webpage resource; and a first sending unit 93, used for sending the webpage address to the server.

The present application discloses a process of loading a webpage resource having a module resource. A JS file may run slowly in a module resource. In the present application, the JS file originally set inside each module is set behind the body resource of the webpage resource. As the webpage resource is loaded in a top-down manner, the process of loading the webpage resource by the browser is running the JS file inside each module after the body resource loading is completed. In a webpage, the body resource corresponds to the first screen page of the webpage. In some embodiments, the JS files of respective module resources (for improving specific functions of respective modules) are run after the first screen page of the webpage is displayed (after the body resource loading is completed).

In the present application, the business logic to be executed originally in the process of loading the body resource is executed after the body resource loading is completed. The program of the body resource to display the first screen page is advanced, and the program of running the JS file by each module is delayed, and thus the efficiency of displaying the first screen page can be improved. Moreover, the present application can speed up display of the first screen page without increasing additional resource request overhead, so that the performance of the webpage can be improved.

Referring to FIG. 1, in the present application, a webpage loading system is further provided, including:

a browser 200 and a server 100;

The browser 200 loads a webpage resource sent by the server 100. The webpage resource includes a head resource, a body resource and a tail resource. The body resource includes at least one module resource, and a JS file of each module resource is set behind the body resource. When loading is performed on each module resource in the webpage resource, a JS resource required for running of the JS file is extracted from each module resource, and the JS resource is registered into a pre-established function running pool. After it is determined that the body resource loading is completed, the JS resource of each module resource in the function running pool is injected into the JS file corresponding thereto.

The server 100 receives a webpage address sent by the browser 200, and calculates a webpage resource required by the webpage address. The webpage resource includes at least one module resource, and a JS file of each module resource is set behind the body resource. The server 100 also sends the webpage resource to the browser 200.

A person skilled in the art can further understand that, various exemplary logic blocks, modules, and algorithm steps described with reference to the disclosure herein may be implemented as specialized electronic hardware, computer software, or a combination of electronic hardware and computer software. For examples, the modules/units may be implemented by one or more processors to cause the one or more processors to become one or more special purpose processors to executing software instructions stored in the computer-readable storage medium to perform the specialized functions of the modules/units.

The flowcharts and block diagrams in the accompanying drawings show system architectures, functions, and operations of possible implementations of the system and method according to multiple embodiments of the present invention. In this regard, each block in the flowchart or block diagram may represent one module, one program segment, or a part of code, where the module, the program segment, or the part of code includes one or more executable instructions used for implementing specified logic functions. It should also be noted that, in some alternative implementations, functions marked in the blocks may also occur in a sequence different from the sequence marked in the drawing. For example, two consecutive blocks actually can be executed in parallel substantially, and sometimes, they can also be executed in reverse order, which depends on the functions involved. Each block in the block diagram and/or flowchart, and a combination of blocks in the block diagram and/or flowchart, may be implemented by a dedicated hardware-based system for executing corresponding functions or operations, or may be implemented by a combination of dedicated hardware and computer instructions.

As will be understood by those skilled in the art, embodiments of the present disclosure may be embodied as a method, a system or a computer program product. Accordingly, embodiments of the present disclosure may take the form of an entirely hardware embodiment, an entirely software embodiment or an embodiment combining software and hardware for allowing specialized components to perform the functions described above. Furthermore, embodiments of the present disclosure may take the form of a computer program product embodied in one or more tangible and/or non-transitory computer-readable storage media containing computer-readable program codes. Common forms of non-transitory computer readable storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

Embodiments of the present disclosure are described with reference to flow diagrams and/or block diagrams of methods, devices (systems), and computer program products according to embodiments of the present disclosure. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a computer, an embedded processor, or other programmable data processing devices to produce a special purpose machine, such that the instructions, which are executed via the processor of the computer or other programmable data processing devices, create a means for implementing the functions specified in one or more flows in the flow diagrams and/or one or more blocks in the block diagrams.

These computer program instructions may also be stored in a computer-readable memory that can direct a computer or other programmable data processing devices to function in a particular manner, such that the instructions stored in the computer-readable memory produce a manufactured product including an instruction means that implements the functions specified in one or more flows in the flow diagrams and/or one or more blocks in the block diagrams.

These computer program instructions may also be loaded onto a computer or other programmable data processing devices to cause a series of operational steps to be performed on the computer or other programmable devices to produce processing implemented by the computer, such that the instructions (which are executed on the computer or other programmable devices) provide steps for implementing the functions specified in one or more flows in the flow diagrams and/or one or more blocks in the block diagrams. In a typical configuration, a computer device includes one or more Central Processing Units (CPUs), an input/output interface, a network interface, and a memory. The memory may include forms of a volatile memory, a random access memory (RAM), and/or non-volatile memory and the like, such as a read-only memory (ROM) or a flash RAM in a computer-readable storage medium. The memory is an example of the computer-readable storage medium.

The computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The computer-readable medium includes non-volatile and volatile media, and removable and non-removable media, wherein information storage can be implemented with any method or technology. Information may be modules of computer-readable instructions, data structures and programs, or other data. Examples of a non-transitory computer-readable medium include but are not limited to a phase-change random access memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disc read-only memory (CD-ROM), a digital versatile disc (DVD) or other optical storage, a cassette tape, tape or disk storage or other magnetic storage devices, a cache, a register, or any other non-transmission media that may be used to store information capable of being accessed by a computer device. The computer-readable storage medium is non-transitory, and does not include transitory media, such as modulated data signals and carrier waves.

The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with the disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

The embodiments in the specification are described in a progressive manner, each embodiment focuses on describing differences between the embodiment and other embodiments, and mutual reference can be made to the same or similar parts between the embodiments.

The description about the disclosed embodiment enables persons skilled in the art to implement or use the present application. A variety of modifications to the embodiments will be obvious for persons skilled in the art, and general principles defined herein can be implemented in other embodiments without departing from the spirit or scope of the present application. Therefore, the present application will not be limited to the embodiments illustrated herein, but will be in line with the broadest scope consistent with the principles and novel features disclosed herein.

What is claimed is:

1. A webpage loading method, comprising:
   requesting a webpage resource from a server;
   starting loading of the webpage resource from the server, wherein the webpage resource comprises a body resource, the body resource comprising at least a first module resource and a second module resource, the first module resource comprising a first JavaScript (JS) file and a first Cascading Style Sheet (CSS) file, the second module resource comprising a second JS file and a second CSS file, wherein the first JS file and the second JS file are loaded after the request for the webpage resource;
   when the first module resource in the body resource of the webpage resource is loaded during the loading of the webpage resource, extracting a first JS resource for running the first JS file from the first module resource, and registering the first JS resource into a function running pool with a first JS parameter;
   when the second module resource in the body resource of the webpage resource is loaded during the loading of the webpage resource, extracting a second JS resource for running the second JS file from the second module resource, and registering the second JS resource into the function running pool with a second JS parameter;
   after loading the body resource, detecting a loading completion event;
   displaying a first interface element of the first module resource according to the first CSS file, wherein a first specific function of the first interface is inoperative until the first JS resource is run;
   displaying a second interface element of the second module resource according to the second CSS file, wherein a second specific function of the second interface is inoperative until the second JS resource is run;
   detecting that the display of the first interface element and the second interface element have been completed; and
   after detecting that the display of the first interface element and the second interface element have been completed, injecting the first JS resource with the first JS parameter in the function running pool into the first JS file that has been loaded as part of the webpage resource, and injecting the second JS resource with the second JS parameter in the function running pool into the second JS file that has been loaded as part of the webpage resource.

2. The method according to claim 1, further comprising:
   clearing the function running pool, after the first JS resource of the first module resource in the function running pool has been injected into the first JS file and the second JS resource of the second module resource in the function running pool has been injected into the second JS file.

3. The method according to claim 1, further comprising:
   before the loading the webpage resource from the server:
   receiving a webpage address, wherein the webpage address corresponds to the webpage resource; and
   sending the webpage address to the server.

4. The method according to claim 1, wherein the webpage resource further comprises a head resource and a tail resource.

5. The method according to claim 1, wherein the JS file is set behind the body resource.

6. A webpage loading apparatus, comprising one or more processors and one or more non-transitory computer-readable memories coupled to the one or more processors and configured with instructions executable by the one or more processors to cause the apparatus to:
   request a webpage resource from a server;
   perform loading of the webpage resource from the server, wherein the webpage resource comprises a body resource, the body resource comprising at least a first module resource and a second module resource, the first module resource comprising a first JavaScript (JS) file and a first Cascading Style Sheet (CSS) file, the second module resource comprising a second JS file and a second CSS file, wherein the first JS file and the second JS file are loaded after the request for the webpage resource;
   extract a first JS resource for running the first JS file from the first module resource in the body resource of the webpage resource when the first module resource is loaded during the loading of the webpage resource, and register the first JS resource into a function running pool with a first JS parameter;
   extract a second JS resource for running the second JS file from the second module resource in the body resource of the webpage resource when the second module resource is loaded during the loading of the webpage resource, and register the second JS resource into a function running pool with a second JS parameter;

detect a loading completion event after the body resource is loaded;

display a first interface element of the first module resource according to the first CSS file, wherein a first specific function of the first interface is inoperative until the first JS resource is run;

display a second interface element of the second module resource according to the second CSS file, wherein a second specific function of the second interface is inoperative until the second JS resource is run;

detect that the display of the first interface element and the second interface element have been completed; and inject, after the display of the first screen page has first interface element and the second interface element have been completed, the first JS resource with the first JS parameter in the function running pool into the first JS file that has been loaded as part of the webpage resource, and inject the second JS resource with the second JS parameter in the function running pool into the second JS file that has been loaded as part of the webpage resource.

7. The apparatus according to claim 6, wherein the operations further comprise:

after the injecting the first JS resource of the first module resource in the function running pool into the first JS file and injecting the second JS resource of the second module resource in the function running pool into the second JS file, clear the function running pool.

8. The apparatus according to claim 6, wherein the operations further comprise:

receive a webpage address, wherein the webpage address corresponds to the webpage resource; and send the webpage address to the server from which the webpage resource is loaded.

9. The apparatus according to claim 6, wherein the webpage resource further comprises a head resource and a tail resource.

10. The apparatus according to claim 6, wherein the JS file is set behind the body resource.

11. A non-transitory computer-readable medium storing instructions, when executed by a computing device, configured to cause the computing device to perform a method comprising:

requesting a webpage resource from a server;

starting loading of the webpage resource from the server, wherein the webpage resource comprises a body resource, the body resource comprising at least a first module resource and a second module resource, the first module resource comprising a first JavaScript (JS) file and a first Cascading Style Sheet (CSS) file, the second module resource comprising a second JS file and a second CSS file, wherein the first JS file and the second JS file are loaded after the request for the webpage resource;

when the first module resource in the body resource of the webpage resource is loaded during the loading of the webpage resource, extracting a first JS resource for running the first JS file from the first module resource, and registering the first JS resource into a function running pool with a first JS parameter;

when the second module resource in the body resource of the webpage resource is loaded during the loading of the webpage resource, extracting a second JS resource for running the second JS file from the second module resource, and registering the second JS resource into the function running pool with a second JS parameter;

after loading the body resource, detecting a loading completion event;

displaying a first interface element of the first module resource according to the first CSS file, wherein a first specific function of the first interface is inoperative until the first JS resource is run;

displaying a second interface element of the second module resource according to the second CSS file, wherein a second specific function of the second interface is inoperative until the second JS resource is run;

detecting that the display of the first interface element and the second interface element have been completed; and after detecting that the display of the first interface element and the second interface element have been completed, injecting the first JS resource with the first JS parameter in the function running pool into the first JS file that has been loaded as part of the webpage resource, and injecting the second JS resource with the second JS parameter in the function running pool into the second JS file that has been loaded as part of the webpage resource.

12. The non-transitory computer-readable medium according to claim 11, wherein the method further comprises:

clearing the function running pool, after the first JS resource of the first module resource in the function running pool has been injected into the first JS file and the second JS resource of the second module resource in the function running pool has been injected into the second JS file.

13. The non-transitory computer-readable medium according to claim 11, wherein the method further comprises: before the loading the webpage resource from the server:

receiving a webpage address, wherein the webpage address corresponds to the webpage resource; and sending the webpage address to the server.

14. The non-transitory computer-readable medium according to claim 11, wherein the webpage resource further comprises a head resource and a tail resource.

* * * * *